(No Model.) 2 Sheets—Sheet 1.

R. MILLS.
CASH REGISTER AND INDICATOR.

No. 475,408. Patented May 24, 1892.

Witnesses:
Charles P. Gordon
John Archer

Inventor:
Ralph Mills (No Model.) 2 Sheets—Sheet 2.

R. MILLS.
CASH REGISTER AND INDICATOR.

No. 475,408. Patented May 24, 1892.

Witnesses
Charles P. Gordon
John Archer

Inventor
Ralph Mills

UNITED STATES PATENT OFFICE.

RALPH MILLS, OF NEW YORK, N. Y.

CASH REGISTER AND INDICATOR.

SPECIFICATION forming part of Letters Patent No. 475,408, dated May 24, 1892.

Application filed May 7, 1891. Serial No. 391,859. (No model.)

*To all whom it may concern:*

Be it known that I, RALPH MILLS, a citizen of the United States, and a resident of the city, county, and State of New York, have invented certain new and useful Improvements in Cash Registers and Indicators, of which the following is a specification.

My invention relates to improvements in cash registers and indicators designed for the use of store-keepers and others to register the total receipts for given periods and for indicating that the amounts paid have been registered by disclosing to view the amounts on figured tablets.

The object of my improvements is to simplify their construction, lessen their cost, and render them more effective in operation; and the invention consists of the devices and combinations of devices hereinafter more fully described, and specifically pointed out in the claims, reference being had to the accompanying drawings, in which—

Figure 1:
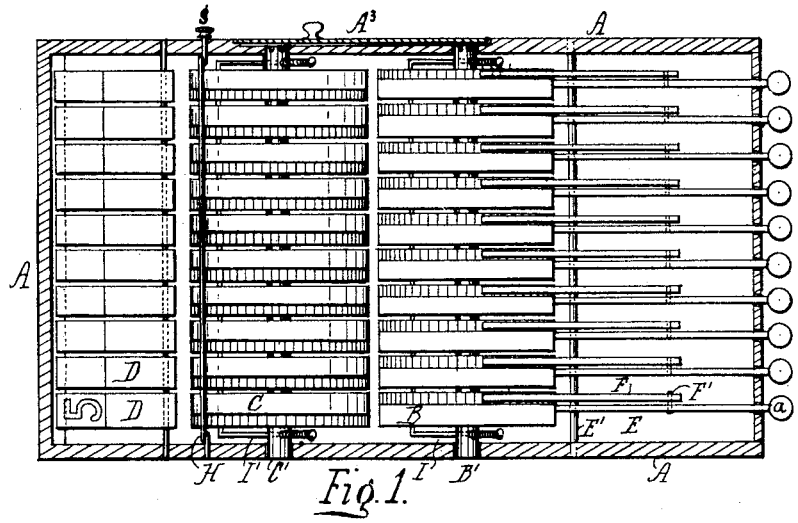
Figure 2:
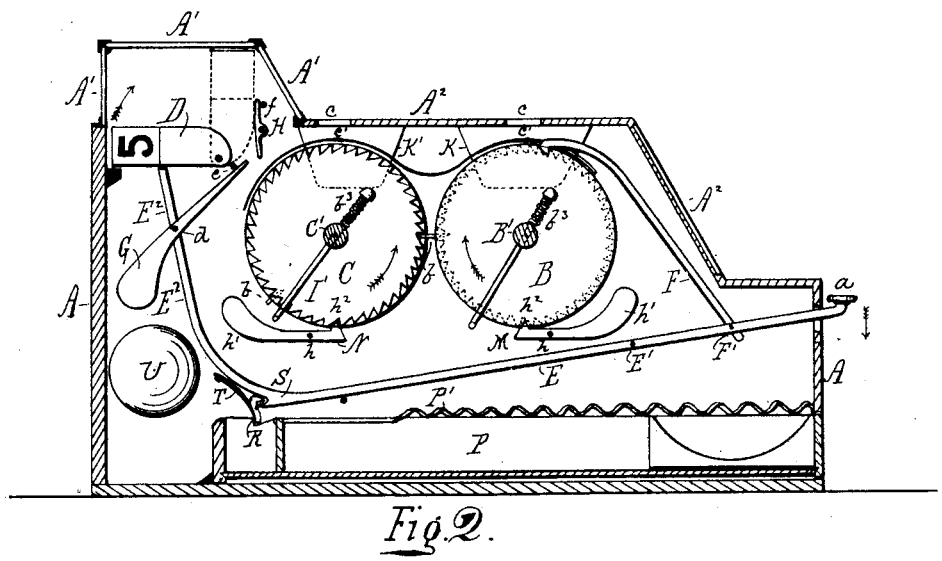
Figure 3:
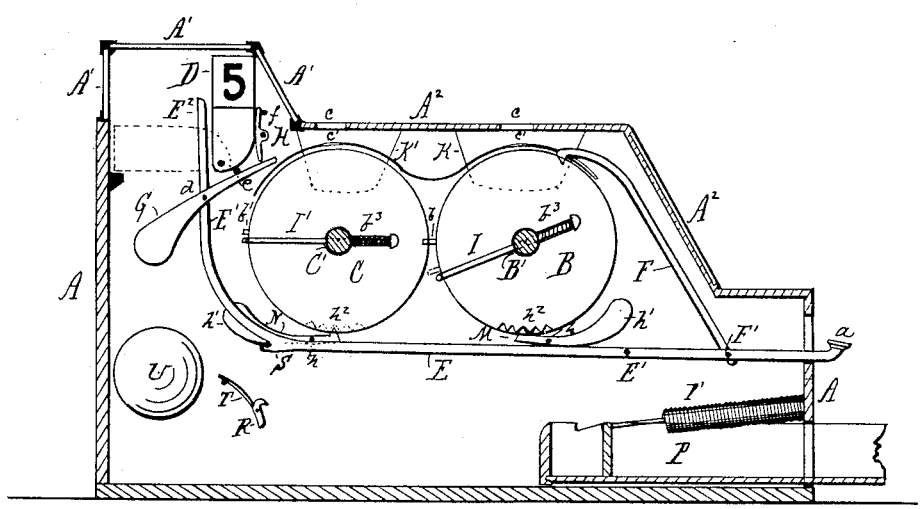
Figure 4:
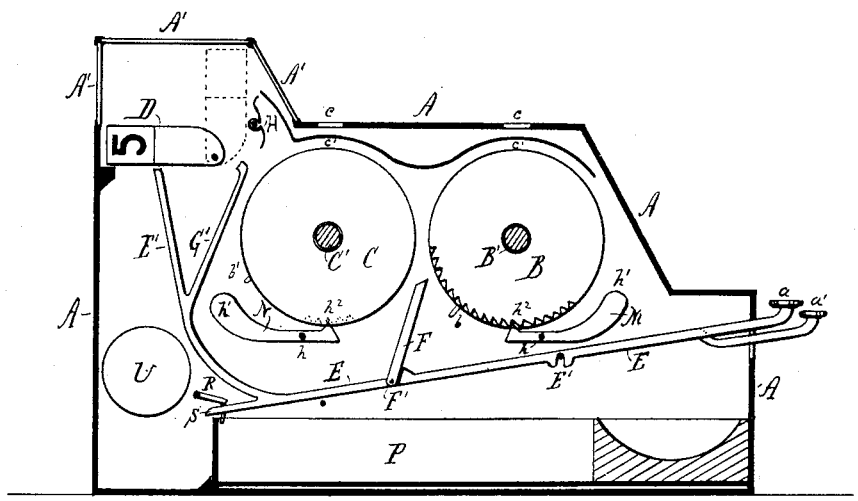

Figure 1 is a horizontal section on a line cut above the bearings of the movable parts, or immediately under the top plate or cover. Fig. 2 is a lengthwise section on a line just inside of one side plate of the casing. This view shows all the parts in position when at rest. Fig. 3 is a section corresponding to that of Fig. 2, but showing the moving or operative mechanism with the key down, illustrating the tablet thrown up exhibiting its number, and the registering-wheel turned one notch. Fig. 4 is a section of the machine to show a modification in respect to the key-lever.

On the drawings, A indicates the box or casing forming the exterior exhibit of my machine; A', parts of the same formed of glass to allow interior devices to be readily seen; $A^2$, part of the casing removable as a cover (hinged or not) above the mechanical devices permitting access thereto when desirable.

$A^3$ is a side door, valve, or flap, (hinged or not,) which may be kept locked when desired. It affords access to the parts, as hereinafter described.

B indicates the first set or gang of registering-wheels, and C the second set or gang of registering-wheels, each set or gang placed upon shafts B' and C', respectively, but not fixed thereto, as they are to revolve upon their shafts while the shafts remain stationary.

The shafts B' and C' are journaled at their ends, so as to be moved by a suitable key when desired, by hand applied at the ends shown covered by door $A^3$. Each registering-wheel is formed with a ratchet or toothed portion extending entirely around the same alongside of its figured portion, as at $B^2$ and $C^2$.

At D is a set or gang of indicator-tablets pivoted upon a rod extending from side to side of the machine, the rod being fixed and the tablets arranged thereon so as to swing, as hereinafter described, by devices brought to bear thereon.

The mechanism for moving the wheels and tablets is as follows: E indicates a key-lever pivoted at E', its one end extending through a slot to the exterior of casing at the front, as at $a$, to receive the pressure of the finger of the operator. The key-lever extends inward beyond pivot E' and with an upward curve or bend, as at $E^2$, reaching to a point just below one of the tablets D. The normal position of all of said tablets is horizontal, as shown in Fig. 2. The dotted lines in said figure show the position when thrown upward singly to allow the figure thereon to be visible through the glass covering. At F is shown a pawl pivoted to the key-lever at F' and having its upper end curved and properly formed to catch to one tooth of the ratchet on wheel B. The movement of the devices is as follows: As the key-lever is pressed downward at its end $a$ the pawl F is carried downward, turning the registering-wheel B one notch over. At the same instant the rear end of the key-lever E is thrown upward against the tablet D, driving it upward to the position shown by dotted lines, Fig. 2, where its number may be seen. When the wheel B has been turned by the above operation notch by notch completely around, its numbers exhausted, then a pin at $b$, secured therein, comes into play, and, engaging with one notch of the wheel C, gives that a turn of one notch or step, giving the number uppermost at which the first wheel has stopped when so numbered, and so on, the two wheels and tablet being moved by the one key-lever actuated by the operator as one set, every two wheels and one tablet being provided with the same moving mechanism—to wit, a lever E, pawl F, and pin b. Correspondingly any desired combination of numbers may be readily formed as desired. The numbers uppermost on the wheels are visible through openings at c, glazed.

The reversing mechanism for the tablets is as follows: At G is shown a tripper weighted at its lowermost end and pivoted to key-lever E, as at d, its upper end resting under a rod e, extending across the machine. At H is a swinging bar extending across the machine pivoted centrally at each end to the casing A, its upper edge kept from swinging forward by a rod f and its lower edge slightly curved, about as shown in Fig. 2. As the end $E^2$ of key-lever rises the tripper G is pushed forward against the bottom edge of bar H, turning it sufficiently to bring its upper edge backward against any tablet of the gang that may be standing upright and throwing it back to horizontal position before the fresh tablet has reached upward sufficiently to reach the bar H. At that moment the forward and upward end of the tripper drops and passes under the edge of the bar H, being controlled by rod e, and permitting the bar H to turn to its normal position vertically edgewise, as shown in Fig. 2. As the key-lever drops backward it leaves the last tablet standing, the tripper passing under bar H to its normal position, (shown in Fig. 2,) each lever E being provided with a tripper G, and each arranged to operate the bar H in the same manner the operation and result is the same for each tablet. The bar H may also be operated by hand at g, Fig. 1, when desired, by knob or by key under cover of a locked door at the end of casing, corresponding with door $A^3$, or the same door may be extended to include the same.

To reverse the registering-wheels B and C, each gang is provided with a yoke I. The two ends of each yoke at the extreme ends of each gang pass through the shaft to which the yoke belongs, as shown in Fig. 2, so that as the shaft of each gang is turned by key at one end under door $A^3$ opened therefor, it carries with it a yoke around over the surface of the wheels against each pin as it reaches one after the other, bringing them up to the position desired for the zero-marks on the gang of wheels.

The pins b of wheels B serve two purposes, being long enough to engage with the ratchet-teeth of wheels C in moving the same, and when in contact with the yoke belonging to gang B effectuating the turning of that gang by the yoke, as described. The wheels C are provided with pins to enable the yoke of that gang to bring the wheels around, also, (as at $b'$,) these pins being short enough to pass between the two gangs of wheels B and C without touching the gang B, as they have no other function than to operate with the yoke of their gang. When not required for use in turning the wheels, the yokes are forced away from the face of the wheels, as shown in Fig. 2, their ends extending beyond the shaft and provided with springs and heads, as at $b^3$, upon which cheeks K, fixed to the lid $A^2$, press when the lid is closed and force the yoke out of combination and allow the several pins to pass.

At M and N are check-levers, each wheel of both gangs being provided with one. They are pivoted at h and weighted at $h'$, and their ends $h^2$ formed to engage with the teeth of the registering-wheels. The check-levers serve to prevent the wheels turning more than the one desired tooth at a time.

At P is a drawer arranged to be drawn or thrown outward by a spring $P'$.

At R is a bar extending across the machine and pivoted at each end to the casing so as to swing, its lower edge adapted to engage with the side cheeks of the drawer, as shown in Fig. 2. The ends of each key-lever at S are formed to engage with cross-bar R and tilt the same. The bar is held to its normal position (shown in Fig. 2) by a spring T. The drawer is held in by bar R, and as each key-lever E is operated it disengages by tilting the bar R from the drawer permitting the spring P, forcing out the drawer at the same time as the registering-wheel B is moved and tablet raised.

At V is a bell operated by the drawer, when it moves outward in the usual manner or as shown.

I do not confine myself to any special material for any part of the mechanism or box of my cash-register, but use any material suitable therefor.

My tablets are formed with two, three, or four figured faces, so as to be visible from more than one point of view. In Fig. 4 the key-lever is shown with the tripper G as a permanent and fixed part thereof, dispensing with pivot and marked $G'$.

The pawl F is set farther back to work up under the wheel B at the back. As there shown, it may be pivoted to the key-lever E or formed as a part thereof. The form of the cross-bar H is changed in this view somewhat to adapt it better to receive the touch of the tripper G when formed as a part of the key-lever or rigidly secured thereto.

Another change is made with respect to cross-bar R, which serves to secure the drawer P, the bar being above the point S of the key-lever to be raised by each of the key-levers as one by one they rise at their rear ends, turning up the bar R and disengaging the drawer.

When desired, the bar R and part S of key-lever E may be dispensed with.

What I claim as new, and desire to secure by Letters Patent of the United States, is—

1. The cash register and indicator comprising the operative mechanism consisting of key-lever E, pawl F, wheels B and C, yokes I and $I'$, indicator-tablets D, tripper G, cross-bar H, cross-bar R, and drawer P, all combined and arranged to operate essentially as herein set forth.

2. In a cash register and indicator, the combination of key-lever E, pivoted at E', pawl F, wheels B and C, yokes I and I', levers M and N, indicator-tablets D, tripper G, and cross-bar H, all constructed and arranged to operate as herein set forth.

3. In a cash register and indicator, the combination of key-lever E, pivoted at E', pawl F, wheels B and C, yokes I and I', indicator-tablets D, tripper G, and cross-bar H, all constructed and arranged to operate as herein set forth.

4. In a cash register and indicator, the combination of key-lever E, pivoted at E', indicator-tablets D, tripper G, and cross-bar H, all constructed and arranged to operate as herein set forth.

RALPH MILLS.

Witnesses:
CHARLES P. GORDON,
JOHN ARCHER.